Figure 1:
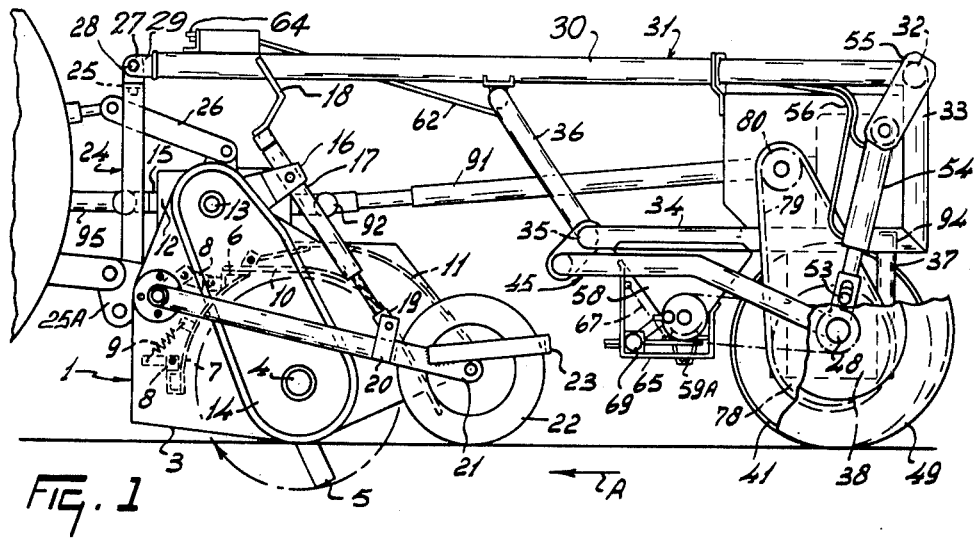

United States Patent [19]
van der Lely

[11] 4,034,687
[45] July 12, 1977

[54] CULTIVATORS

[75] Inventor: Ary van der Lely, Maasland, Netherlands

[73] Assignee: C. van der Lely N. V., Maasland, Netherlands

[21] Appl. No.: 571,091

[22] Filed: Apr. 24, 1975

[30] Foreign Application Priority Data

May 2, 1974 Netherlands .................. 7405875

[51] Int. Cl.² ..................................... A01C 7/08
[52] U.S. Cl. .................................. 111/13; 172/52; 172/414; 172/518; 172/640; 172/776
[58] Field of Search .............. 172/50, 51, 52, 68, 172/69, 70, 71, 72, 314, 414, 518, 640, 776; 111/63, 10, 43; 222/485, 486

[56] References Cited

U.S. PATENT DOCUMENTS

| | | | |
|---|---|---|---|
| 374,569 | 12/1887 | Wyatt | 172/52 |
| 435,691 | 9/1890 | Freeman | 222/486 |
| 1,021,929 | 4/1912 | Hovey | 172/69 |
| 1,211,811 | 1/1917 | Bailey | 172/518 |
| 1,388,930 | 8/1921 | Burgess | 172/52 X |
| 2,353,659 | 7/1944 | Frank | 172/414 X |
| 2,368,331 | 1/1945 | Seaman | 172/52 X |
| 2,634,029 | 4/1953 | Juzwiak | 222/485 |
| 2,762,535 | 9/1956 | Kriegbaum | 222/485 |
| 2,835,420 | 5/1958 | Foley | 222/485 |
| 3,133,598 | 5/1964 | Caldwell | 172/51 |
| 3,140,800 | 7/1964 | Henderson | 222/486 X |
| 3,508,617 | 4/1970 | Paynter | 172/68 |
| 3,661,213 | 5/1972 | Taylor | 172/72 |
| 3,685,469 | 8/1972 | Rogers | 172/68 X |
| 3,705,628 | 12/1972 | King | 172/68 |
| 3,810,434 | 5/1974 | van der Lely et al. | 172/68 X |

*Primary Examiner*—Paul E. Shapiro
*Attorney, Agent, or Firm*—Mason, Mason & Albright

[57] ABSTRACT

A cultivator has a beamed frame with a coupling member that can be attached to the lower points of a lift device on a tractor. The cultivator has an assembly of blades mounted on a horizontal shaft which is driven via a forward transmission connected to the p.t.o. of the tractor. A power driven roller is turned by a rear transmission that is interconnected to the forward transmission by a telescopic shaft. The roller is mounted on a supporting structure including overhead beams that extend forwardly to a pivot connection on top of the coupling member. The roller is vertically displaceable and mounted on pivoted arms of the structure. Hydraulic assemblies can raise and/or lower the roller relative to ground wheels on the structure, for transport. A delivery mechanism including a hopper with a connectable feeder drive is supported on the structure in front of the roller. The roller can be driven to aid the forward travel of the implement.

9 Claims, 5 Drawing Figures

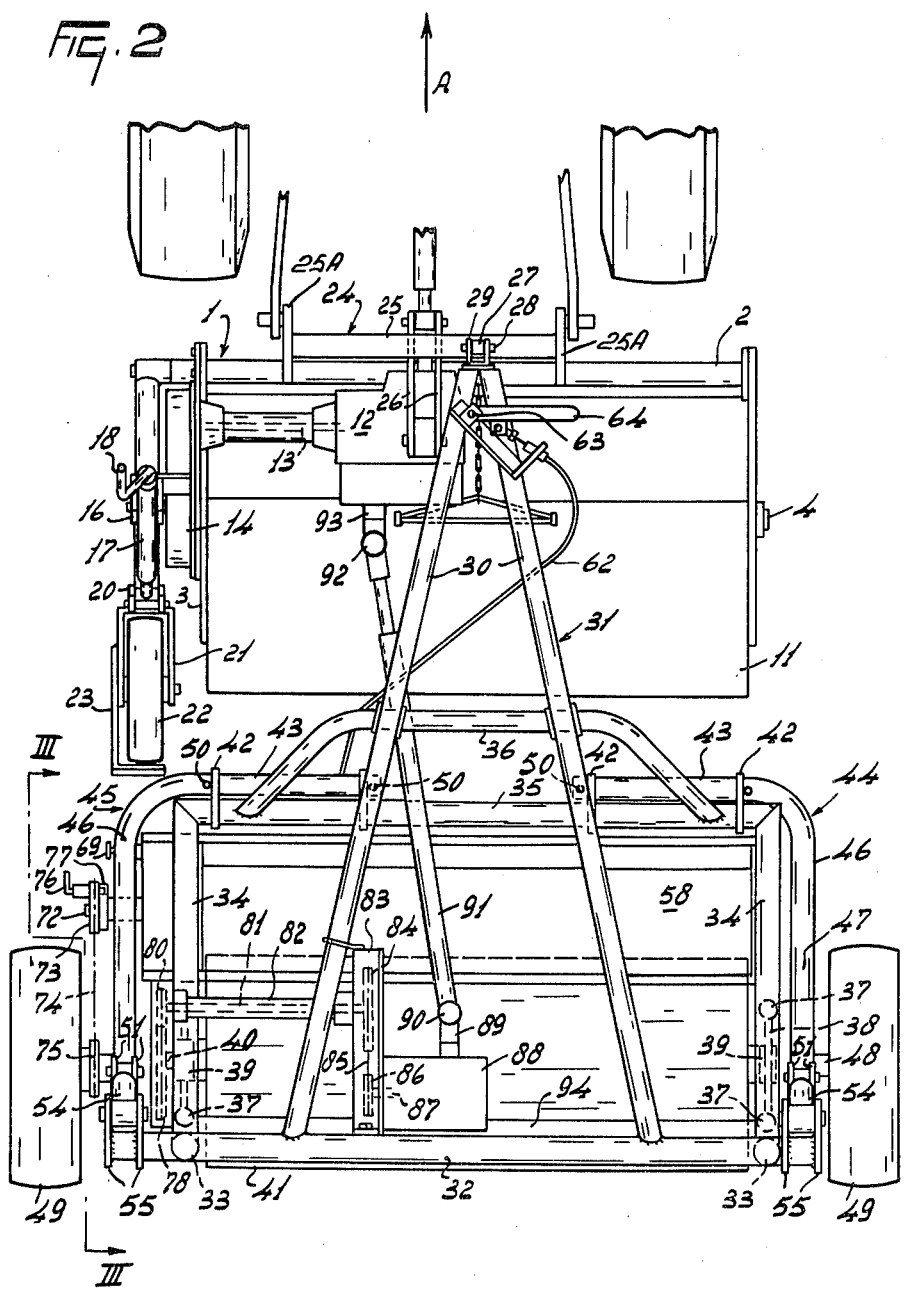

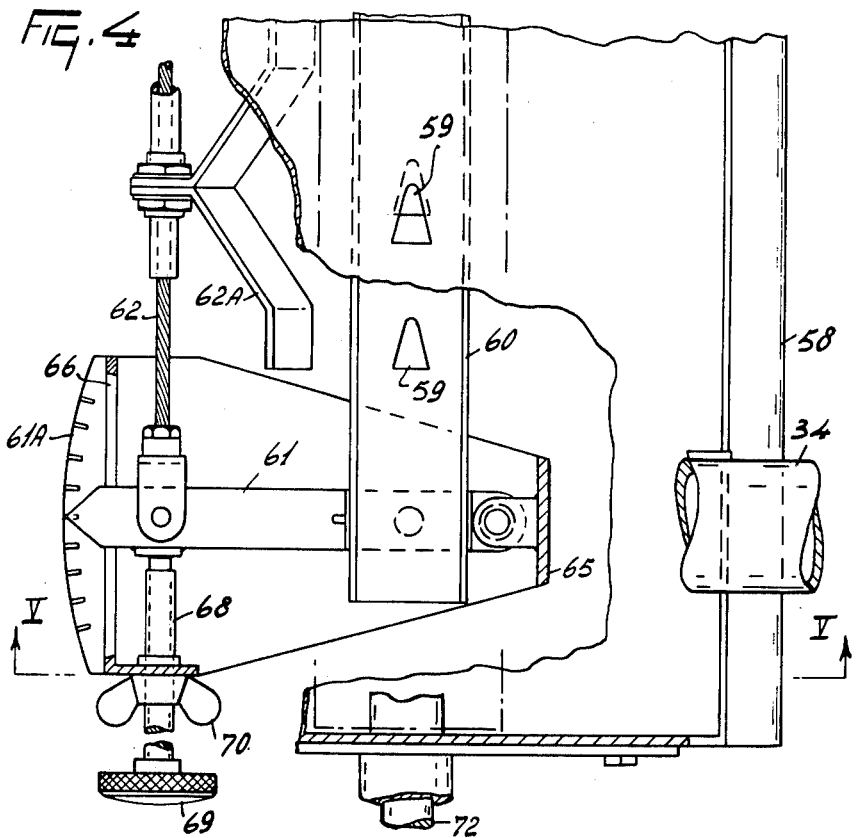
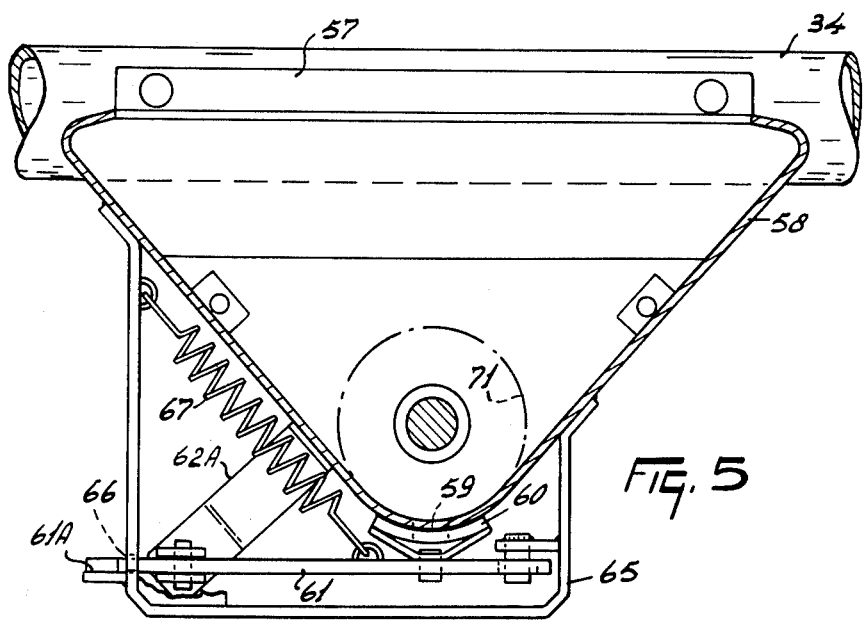

CULTIVATORS

According to the invention, there is provided a cultivator of the kind set forth, wherein the roller is arranged to be power-driven during the use of the cultivator and mechanism for delivering material onto and/or into the ground is provided which will supply such material to the ground between the soil working members and the roller.

Figure 3:
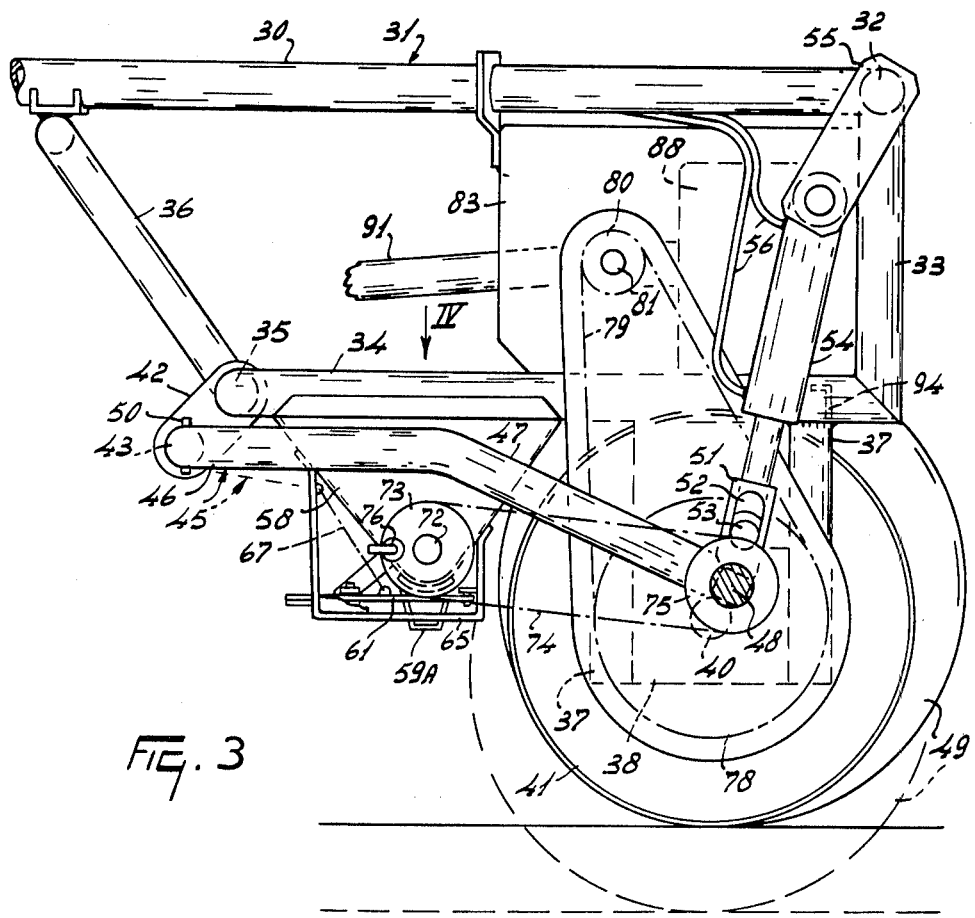

For a better understanding of the invention, and to show how the same may be carried into effect, reference will now be made, by way of example, to the accompanying drawings, in which:

FIG. 1 is a side elevation of a soil cultivating implement or cultivator in accordance with the invention connected to the rear of an agricultural tractor, FIG. 2 is a plan view of the cultivator of FIG. 1, FIG 3 is a section, to an enlarged scale, taken on the line III—III in FIG. 2, FIG. 4 is a part-sectional elevation, to an enlarged scale, showing features of a mechanism for delivering material onto and/or into the ground in greater detail, and FIG. 5 is a section taken on the line V—V in FIG. 4.

Referring to the drawings, the soil cultivating implement or cultivator that is illustrated has a frame 1 which includes a main frame beam 2 that extends substantially horizontally transverse, and normally substantially horizontally perpendicular, to the intended direction of operative travel of the cultivator which is indicated by an arrow A in FIGS. 1 and 2 of the drawings, the main frame beam 2 being at substantially the front of the frame 1 with respect to that direction. Substantially vertical side plates 3 are fastened to the opposite ends of the main frame beam 2 so as to lie in parallel relationship with each other and with the direction A. Horizontally aligned bearings are carried by the two side plates 3 in lower regions of those plates and a horizontal shaft 4 that is parallel to the main frame beam 2 is rotatably mounted in said bearings, the shaft 4 being located rearwardly of the beam 2 with respect to the direction A. The shaft 4 is provided, in a manner which is known per se, with a plurality of soil working members which may be in the illustrated form of blades 5 or in any other form appropriate to the particular manner of working that the cultivator is to undertake. In any case, the blades 5 or other soil working members extend along the shaft 4 in a plurality of rows, the rows being wound helically around the longitudinal axis of the shaft 4. There may conveniently, but not essentially, be three rows of blades 5 or other soil working members with the three rows spaced apart from one another at 120° intervals around the longitudinal axis of the shaft 4 at any given point along that shaft.

A beam 6 of L-shaped cross-section extends between the two side plates 3 in parallel relationship with the main frame beam 2 but does not have its opposite ends directly connected to the side plates. The beam 6 is disposed to the rear of the main frame beam 2 with respect to the direction A. A first screen 7 of cylindrically curved configuration partly surrounds the shaft 4 and its blades 5 or other soil working members at a location principally above and in front of the shaft 4 with respect to the direction A, said screen 7 having its central axis of curvature substantially coincident with the longitudinal axis of the shaft 4 and said screen 7 subtending an angle of less than 90° at that axis. An upper edge region of the first screen 7 is secured to the beam 6 and the screen extends downwardly and forwardly, with respect to the direction A, away from the beam 6. The first screen 7 is substantially radially yieldable away from the shaft 4 and its blades 5 or other soil working members, during the operation of the cultivator, because a hollow beam that is secured to its lower and leading edge region is connected by arms 8 to pivots carried by the side plates 3 and because further arms 8 pivotably connect the beam 6 to anchorages on the two side plates 3. Tension springs 9 stretched between lugs on the leading surface of the screen 7 and pins fixed to the side plates 3 urge the upper arms 8 downwardly into engagement with stops that are not visible in the drawings and the first screen 7 thus tends to be maintained in the position thereof that can be seen in FIG. 1. The beam 6 is also provided with a plurality of spring steel rods 10 at least part of each of which rods 10 is curved in such a way that the center of curvature of that part substantially coincides with the longitudinal axis of the shaft 4. The upper, and leading with respect to the direction A, ends of the rods 10 are fastened to the beam 6 in such a way that the rods are in regularly spaced apart relationship along the length of that beam and form a grating with each rod contained in a plane that extends substantially perpendicular to the longitudinal axes of the beam 2 and shaft 4. The grating that is afforded by the rods 10 extends rearwardly over the top of the shaft 4 and its blades 5 or other soil working members from the beam 6 and downwardly towards the ground surface behind those parts. A second screen 11 of closed formation overlies the spring steel rods 10 in spaced relationship therewith and has its leading end pivotably mounted in such a way that the screen 11 is movable about an axis that is substantially parallel to the main frame beam 2 and to the shaft 4.

A gear box 12 is secured to the main frame beam 2 at substantially the mid-point of the latter, said gear box 12 having a rotary output shaft 13 which projects from one side of the gear box 12 in parallel relationship with the main frame beam 2, the end of said shaft 13 that is remote from the gear box 12 being drivingly connected to one end of the shaft 4 by transmission members contained within a casing 14 that is fastened to the corresponding side plate 3. The end of the output shaft 13 that is located inside the gear box 12 carries a bevel pinion (not visible) whose teeth are in driven mesh with those of a further bevel pinion carried by a rotary input shaft 15 of the gear box, said shaft 15 having a splined or otherwise keyed portion which projects forwardly from the front of the gear box 12 in substantially the direction A. Two plates 16 project rearwardly from near the top of the casing 14 in parallel relationship and a tubular housing 17 is pivotably mounted between the rearmost ends of the two plates 16 with the aid of trunnion pins. A height adjustment assembly is mounted in the tubular housing 17 and, since its construction is known per se, it does not require detailed description. A crank handle 18 of said assembly is located at the top of the housing 17 and can be manually rotated in either direction to extend a spindle from the lowermost end of the housing or to retract that spindle further into the housing. The lowermost end of the spindle carries a bracket 19 which is pivotally connected to upright supports 20 that are fastened to an arm 21 between the opposite ends of that arm. The leading end of the arm 21 with respect to the direction A is pivotally connected to the neighbouring side plate 3 so as to be turnable upwardly and downwardly about a substantially horizontal axis that is substantially parallel to the main frame beam 2 and to the shaft 4, said axis conveniently, as illustrated, being actually coincident with the longitudinal axis of the main frame beam 2. The rear end of the arm 21 is formed as a fork and a ground wheel 22 is rotatably mounted between the limbs of the fork about an axle interconnecting those limbs. One limb of the fork is provided with a scraper 23 having a scraping edge located very close to the ground-engaging surface of the wheel 22.

The frame beam 2 is provided with a coupling member or trestle 24 that is constructed and arranged to enable the frame 1 of the cultivator to be coupled to the three-point lifting device or hitch at the rear of an agricultural tractor or other operating vehicle for the cultivator. It will be noted from FIG. 2 of the drawings that the coupling member or trestle 24 is offset to one side of a substantially vertical plane of approximate symmetry of the cultivator that extends parallel to the direction A. The coupling member or trestle 24 includes a tie beam 25 whose top is substantially horizontally disposed and two horizontally spaced apart coupling plates 25A that are located in a lower region thereof. The lower coupling plates 25A carry substantially horizontally aligned pins for pivotal co-operation with the free ends of the lower lifting links of a three-point lifting device or hitch. The coupling member or trestle 24 also includes a pair of parallel but spaced apart strips 26 whose rearmost ends are pivotally connected to an anchorage at the top of the gear box 12 and whose leading ends are arranged for pivotal connection to the free end of the upper adjustable lifting link of said three-point lifting device or hitch. The tie beam 25 is provided with an upright support 27 and that support is substantially contained within the aforementioned imaginary vertical plane of substantial symmetry of the cultivator that extends parallel to the direction A. A strong horizontal pivot pin 28 that defines an axis which is parallel to the main frame beam 2 and to the shaft 4 projects from both sides of the support 27 and the limbs of a fork 29 are turnable about the pivot pin 28 at the opposite sides of said support. The fork 29 is mounted at the junction between two forwardly (with respect to the direction A) convergent arms 30 both of which arms are substantially horizontally disposed. The arms 30 form part of a supporting structure that is generally indicated by the reference 31 and their rearmost ends that are remote from the bracket 36 are rigidly secured to a horizontal frame beam 32.

The frame beam 32 extends substantially perpendicular to the direction A and, near its opposite ends, is rigidly secured to the uppermost ends of two substantially vertical frame beams 33. The lower ends of the two frame beams 33 are connected to the rear ends of two further frame beams 34 which both extend substantially horizontally forwards from the beams 33 in parallel relationship with each other and with the direction A. The leading ends of the two frame beams 34 are rigidly interconnected by a further substantially horizontal frame beam 35 that is parallel to the frame beam 32. The upwardly and forwardly (with respect to the direction A) convergent limbs of a bracket 36 have their lowermost and rearmost ends rigidly secured to the top of the frame beam 35, the base or crossbar of said bracket 36 being in parallel relationship with the beams 32 and 35. The base or crossbar of the bracket 36 carries cradles which supportingly sustain the two arms 30 from beneath. Each of the two frame beams 34 has the uppermost ends of a corresponding pair of vertically disposed and downwardly directed supports 37 rigidly secured to it, the two supports 37 of each pair being spaced apart from one another in the direction A. The supports 37 carry vertical plates 38 in which aligned bearings 39 for stub shafts 40 at the opposite ends of a roller 41 are mounted. The stub shafts 40 coincide with the axis of rotation of the roller 41 which axis is parallel to the beams 32 and 35. As will be seen from FIG. 2 of the drawings, the working width (axial length) of the roller 41 is substantially the same as and coincides with, that of the shaft 4 and its blades 5 or other soil working members. The diameter of the roller 41 is equal to substantially one-quarter of its axial length, the roller 41 being of a hollow right-circular cylindrical configuration and being capable of containing ballast in its interior.

Two lugs 42 project downwardly and forwardly with respect to the direction A from opposite end regions of the frame beam 35 and their foremost and lowermost ends pivotably support a connecting portion 43 between two arms 44 and 45. The connecting portion 43 is parallel to the frame beams 32 and 35 and pins 50 are entered transversely through it alongside the two lugs 42 to prevent significant axial displacement of that portion relative to those lugs. Each of the arms 44 and 45 is integrally coupled to the connecting portion 43 by a 90° bend (see FIG. 2) and each of the arms 44 and 45 comprises a leading substantially horizontal portion 46 that is directed rearwardly away from the corresponding bend with respect to the direction A in substantially parallel relationship with that direction and a rear downwardly inclined portion 47 whose leading end has an integral obtuse angular junction with the corresponding leading portion 46. The lowermost and rearmost ends of the two arm portions 47 carry corresponding horizontal stub shafts 48 on which corresponding pneumatically tyred ground wheels 49 are disposed.

It will be evident from FIG. 2 of the drawings that the spacing between the arm 45 and the neighbouring beam 34 is greater than is the spacing between the arm 44 and its neighbouring beam 34. The greater spacing alongside the arm 45 accommodates a drive transmission to the roller 41 which will be described below. A pair of lugs 51 projects upwardly from each arm portion 47 immediately above the corresponding stub shaft 48, each lug 51 being formed with a corresponding slot 52 that extends lengthwise of that lug. Pins 53 (FIGS. 1 and 3) are upwardly and downwardly slidable along the two slots 52 corresponding to each pair of lugs 51, the short length of sliding movement which is possible being limited by the opposite ends of the slots 52. Each pin 53 is mounted at the free end of the piston rod of a corresponding double-acting hydraulic piston and cylinder assembly 54. The uppermost ends of the cylinders of the assemblies 54 are pivotally connected to the lowermost free ends of downwardly and forwardly inclined pairs of lugs 55 rigidly secured to the opposite ends of the frame beams 32 immediately beyond the vertical beams 33. Flexible hydraulic ducts 56 open into the cylinders of the two double-acting assemblies 54 close to the opposite upper and lower ends of those cylinders and said ducts extend along the corresponding arms 30 (preferably inside those arms 30 when, as is preferred, they are of hollow tubular formation) to the leading ends of the arms where they are provided with means that is known per se and that is not illustrated in the drawings to enable them to be placed in connection with the hydraulic system of an agricultural tractor or other vehicle which operates the cultivator during its use.

A hopper 58 (see particularly FIGS. 4 and 5 of the drawings) is connected to the frame beams 34 by corresponding supporting strips 57. The hopper 58 is of basically triangular cross-section and is located just in front of the roller 41 with respect to the direction A when the cultivator is viewed in plan (FIG. 2). The hopper 58 forms part of mechanism for delivering material onto and/or into the ground when the cultivator is in use. The hopper 58 extends throughout at least as great a working width as does the roller 41 and its curved bottom is formed with a plurality of regularly spaced apart outlet ports 59 each of which is of isosceles triangular configuration having a rounded apex. A strip-shaped masking member 60 of curved cross-section extends along the hopper 58 beneath the bottom thereof and is formed with a plurality of outlet openings that are similarly shaped, dimensioned and arranged to the outlet ports 59 and which can be caused to register with those outlet ports 59 to a greater or lesser extent in dependence upon the position to which the masking member 60 has been slid relative to the bottom of the hopper 58. One end of the masking member 60 is pivotably connected to a pointer arm 61 which arm, in turn, is pivotally connected to a supporting bracket 65 carried beneath the corresponding end of the hopper 58. The pointer arm 61 is also pivotally connected by a fork to one end of the core of a Bowden cable 62 whose sheath is supported from the bottom of the hopper 58 by a bracket 62A. The Bowden cable 62 also extends forwardly of the cultivator from the hopper 58 and has the leading end of its core connected to a lever 64 that is turnable about an upright pivot 63 immediately to the rear of the junction between the leading ends of the arms 30. The lever 64 is accessible to the driver of a tractor to which the cultivator is operatively connected in the use thereof.

The indicating end of the pointer arm 61 that is remote from its pivotal connection with the bracket 65 is entered through a slot 66 in an upright limb of that bracket and is moveable over a calibrated dial 61A formed along an arcuately curved edge of a plate that projects from the supporting bracket 65 immediately beneath the slot 66. A tension spring 67 (FIG. 5) is stretched between an eye on the top of the pointer arm 61 and an eye on the bracket 65 and thus maintains the arm 61 in engagement with the upper edge of the slot 66. The spring 67 also maintains the masking member 60 in abutting engagement with the bottom of the hopper 58. The opposite end of the masking member 60 is also maintained in abutting engagement with the bottom of the hopper 58 but, at that end, no means is provided to control the position of the masking member 60 lengthwise along the hopper bottom. The bracket 65 comprises a limb formed with an internally screw-threaded eye. The corresponding screw-threaded shank 68 of a set bolt 69 is entered through the eye and can occupy any chosen axial position relative to that eye. The screw-threaded shank 68 is provided with a winged lock nut 70 that can be tightened against said limb of the bracket 65 to prevent axial displacement of the shank of the set bolt 69. The set bolt 69 affords an adjustable stop and it will be seen from FIG. 4, in particular, of the drawings that the free end of the shank 68 of the set bolt lies in the path of angular displacement of the pointer arm 61 so that it can occupy a position, as illustrated, in which it will prevent the pointer arm 61 from moving over the dial 61A beyond a predetermined setting and will thus prevent the outlet ports 59 from being opened beyond an extent directly corresponding to that setting.

Part of the end wall of the hopper 58 that is adjacent to the arm 61 is dismountable to allow of the removal and replacement of a feeder member 71 that extends lengthwise along the interior of the hopper 58 immediately above the outlet ports 59 that are formed in the bottom thereof. A driving shaft 72 at one end of the feeder member 71 projects through the dismountable part of the end wall of the hopper 58 and is there provided with a sprocket wheel 73 (FIGS. 2 and 3) which is coupled by a transmission chain 74 to a sprocket wheel 75 carried by the rotatable stub shaft 48 of the corresponding ground wheel 49. The sprocket wheel 73 is rotatably, rather than fixedly, mounted on the driving shaft 72 of the feeder member 71 but can be fixed in position relative to that shaft by employing a locking pin 76 which is carried by the sprocket wheel, the tip of the locking pin 76 being entered through a hole in a disc 77 that is fastened to the shaft 72 to effect the connection. When the locking pin 76 is operative, the sprocket wheel 73 is fast in rotation with the disc 77 and the shaft 72. When the locking pin 76 is moved to a withdrawn inoperative position, the feeder member 71 will not be driven during the operation of the machine and the mechanism for delivering material onto and/or into the ground will remain inoperative.

The stub shaft 40 of the roller 41 that is located adjacent to the arm 45 carries a sprocket wheel 78 (FIGS. 3 and 2) and that sprocket wheel is coupled to a much smaller sprocket wheel 80 by a transmission chain 79 housed inside the casing. The sprocket wheel 80 is secured to one end of a shaft 81 that extends parallel to the frame beams 32 and 35, within a tubular casing 82, to within a further casing 83. The shaft 81 is provided, inside the further casing 83, with a sprocket wheel 84 that is connected by a transmission chain 85 to a smaller sprocket wheel 86. The sprocket wheel 86 is secured to the end of a shaft 87 which projects from a gear box 88 fastened to the frame beam 32. The shaft 87 is provided, inside the gear box 88, with a bevel pinion whose teeth are in driven mesh with those of a further bevel pinion secured to a shaft 89 that projects forwardly from the front of the gear box 88 in substantially the direction A. The gear box 12 has a second output shaft 93 that projects substantially horizontally rearwards from its back and that output shaft 93 is in driving connection with the shaft 89 at the front of the gear box 88 by way of an intermediate telescopic transmission shaft 91 that is of a construction which is known per se having universal joints 90 and 92 at its rear and front ends respectively. The frame beams 34 carry a scraper strip 94 (FIGS. 2 and 3) which scraper strip has a scraping edge located close to the smooth cylindrically curved surface of the roller 41 in such a position that said strip 94 extends upwardly away from that surface of the roller.

In the use of the cultivator that has been described, it is connected to the three-point lifting device or hitch at the rear of an operating tractor or other vehicle by the coupling member or trestle 24 and its strips 26. The rotary input shaft 15 of the gear box 12 is placed in driven connection with the power take-off shaft of the same tractor or other vehicle by way of an intermediate telescopic transmission shaft 95 (FIG. 1) that is basically similar to the known shaft 91 having universal joints at its opposite ends. As the cultivator moves in the direction A over land that is to be worked, the shaft 4 is rotated in the direction that is indicated by an arrow in FIG. 1 of the drawings which direction is such that the blades 5 or other soil working members which it carries move forwardly through the soil with respect to the direction A. The soil that is displaced by the blades 5 or other members moves upwardly in front of the shaft 4 beneath the first screen 7 and rearwardly over that shaft where it is thrown against the grating that is afforded by the spring steel rods 10. Any stones, roots hard lumps of soil and the like are unable to pass through the gaps between the grating and slide downwardly along the rods 10 where they fall to the bottom of the broad furrow that has been excavated by the blades 5 or other soil working members. Loose, finely divided soil, on the other hand, passes through the gaps between the rods 10 and is directed downwardly towards the ground surface by the second screen 11 where it falls on top of, and thus buries, any such stones, hard lumps of soil and the like as are referred to above. The depth to which the blades 5 or other soil working members penetrate into the soil is governed by moving the ground wheel 22 bodily upwards or downwards relative to the frame 1. This is accomplished by manually rotating the crank handle 18 in an appropriate direction so that the arm 21 upon which the ground wheel 22 is mounted is turned either upwardly or downwardly about its pivotal connection to the neighbouring side plate 3 of the frame. Grass seeds or other material which it may be desired to deliver to the worked soil can be contained within the hopper 58 and, when the locking pin 76 is rendered operative, the feeder member 71 within the hopper 58 will be rotated from the ground wheel 49 that is close to the arm 45 at a speed which will be proportional to the speed of travel of the cultivator over the ground so that the seeds or other material will be delivered through the outlet ports 49 at a volume per unit area of ground traversed by the cultivator that is dependent upon the effective areas of the outlet ports 59 which are dictated by the setting of the masking member 60 relative to the bottom of the hopper 58. It will be remembered that the position of the masking member 60 relative to the bottom of the hopper 58 can be controlled from the lever 64 that is accessible to the driver of a tractor operating the cultivator. The pointer arm 61 is pre-set to the value on the dial 61A that corresponds to the rate of sowing of seed, or distribution of other material, that is required and the set bolt 69 is then positioned to prevent that rate being exceeded, the lock nut 70 being tightened to maintain the adjusted position of the bolt 69. The lever 64 is then movable between a position corresponding to the outlet ports 59 being fully closed and a position corresponding to the required rate of delivery of the grass seed or other material within the hopper 58. It will be noted from FIGS. 1 and 2 of the drawings that plates 59A are arranged beneath the various outlet ports 59 in the bottom of the hopper 58 so that seeds or other materials fall onto those plates and are spread to some extent before falling further onto the ground surface so that the seed sowing or other material distribution is substantially uniform throughout the working width of the cultivator rather than sowing or distribution in rows that are parallel to the direction A resulting.

The roller 41 that is carried by the supporting structure 31 rolls over the seeds or other material supplied by the hopper 58, the roller 41 being power-driven from the operating tractor or other vehicle by way of the transmission members that have been described above. The transmission arrangement is, in fact, such that the speed of rotation of the roller 41 (in an anticlockwise direction as seen in FIGS. 1 and 2 of the drawings) is greater than that required to match the speed of travel of the tractor or other operating vehicle in the direction A. The result is that the roller 41 exerts a forwardly propelling effect upon the tractor/vehicle and cultivator combination thus at least partly compensating for the rearward driving force that is exerted by the operating blades 5 or other soil working members. The smooth cylindrically curved outer surface of the roller 41 tends to be kept free of adhering mud and the like, even on very heavy and/or very wet soil, as a result of the rubbing effect which is produced as it rotates at a speed greater than that required to match the speed of travel in the direction A. If, despite this rubbing effect, some mud or other material should stubbornly adhere to the roller 41, it will be positively removed from the roller surface by the closely neighbouring scraper strip 94.

The supporting structure 31 of the roller 41 and the hopper 58 that is located in front of that roller can move upwardly and downwardly about the pivot pin 28 during operation of the cultivator, any such pivotal movement taking place relative to the frame 1 of the part of the cultivator which operatively supports the blades 5 or other soil working members. The ground wheels 49 are adjusted to levels, during operation of the cultivator, which are such that they will just be maintained in rotation as the cultivator makes progress over the ground with one of them driving the feeder member 71 of the mechanism for delivering material onto and/or into the ground when operation of that mechanism is required. When the cultivator meets undulations in the surface of the ground over which it is travelling, the arms 44 and 45 can turn upwardly and downwardly about the longitudinal axis of the connecting portion 43 between them to the extent that is dictated by abutment of the pins 53 against the opposite ends of the slots 52. When it is desired to transport the cultivator from one place to another without performing any cultivating operation, the three-point lifting device or hitch of the tractor or other vehicle to which the cultivator is connected is raised thus bridging the blades 5 or other soil working members clear of contact with the ground surface. The piston rods of the hydraulic piston and cylinder assemblies 54 are hydraulically extended so that the ground wheels 49 are turned bodily downwards about the longitudinal axis of the connecting portion 43 between the two arms 44 and 45. The roller 41 is thus raised clear of contact with the ground surface and transport of the cultivator can then commence without undue strain upon the three-point lifting device or hitch of the tractor or other vehicle to which it is connected because heavy parts, such as the ballasted roller 41, that are located at the rear of the cultivator are directly supported from the ground surface by the pneumatically tyred wheels 49.

The cultivator that has been described is particularly, but not exclusively, suitable for the re-generation of meadow land since it can, in a single traverse, thoroughly cultivate and sow with fresh grass seed a broad strip of old, and very likely weed-infested, grass, most of the old turf and weeds being well buried beneath the new seed bed. The power-driven roller 41 effectively compresses the worked soil and any seeds or other materials that may have been added thereto, the construction and arrangement whereby said roller rotates forwardly at a speed a little greater than that required to match the speed of travel of the cultivator over the ground being particularly effective in producing a smooth surface with very little, if any, imperfections as a result of mud and the like adhering to the roller surface. Obviously, the weight of the roller 41 is adjusted by adding or removing ballast to match the nature and condition of the soil that is to be cultivated. If desired, the mechanism for delivering material onto and/or into the ground may incorporate a separate hopper or other container for fertiliser to be delivered to the soil independently of grass seeds and/or other seeds contained within the hopper 58.

Although various features of the cultivator that has been described and/or that are illustrated in the accompanying drawings will be set forth in the following claims as inventive features, it is emphasised that the invention is not necessarily limited to those features and that it includes within its scope each of the parts of the cultivator that has been described and/or that is illustrated in the accompanying drawings both individually and in various combinations.

What we claim is:

1. A soil cultivator in combination with a material delivery mechanism comprising a frame having a coupling member at the front thereof that is connectable to a prime mover, soil working means rotatably supported on said frame and said soil working means extending transverse to the normal direction of travel of the cultivator, driving means engaging said soil working means to rotate same, a power driven roller being positioned a substantial distance to the rear of said soil working means and said roller being rotatable about a horizontal axis, said material delivery mechanism being located between the soil working means and said roller, said roller and soil working means being interconnected by a supporting structure that is connected to said frame, a drive transmission of said driving means being drivenly connected to rotate said roller forwardly with respect to the direction of travel at a speed in excess of that required to match the speed of travel of said cultivator, said supporting structure being pivoted to a portion of said frame that supports said soil working means and pivotable about an axis that extends substantially perpendicular to the direction of travel, said mechanism and said roller being mounted on said supporting structure and the latter having ground wheels located adjacent the rear thereof and the ends of said roller.

2. A cultivator as claimed in claim 1, wherein the diameter of said roller is equal to about one-fourth the length thereof and the peripheral surface of said roller is smooth.

3. A cultivator as claimed in claim 1, wherein said roller is mounted on the supporting structure and vertically displaceable relative to a portion of said frame that supports said soil working means.

4. A cultivator as claimed in claim 1, wherein said mechanism comprises an elongated hopper that extends transverse and normally perpendicular to the direction of travel, said hopper being located immediately in front of said roller with respect to that direction and extending along substantially the entire length of said roller.

5. A cultivator as claimed in claim 1, wherein said driving means is connected to a power take-off shaft of the prime mover and said transmission interconnects one end of the roller to a forward gear transmission that is in driving engagement with said soil working means.

6. A cultivator as claimed in claim 5, wherein said forward transmission engages said soil working means and rotates same in a direction opposite to that of said roller.

7. A cultivator as claimed in claim 1, wherein each wheel is mounted on a part of the supporting structure that is pivotable about an axis located in front of that wheel with respect to the direction of travel, each wheel being rotatably mounted on shaft means and said shafts means with said wheels being vertically displaceable by at least one hydraulic piston and cylinder assembly, said assembly being interconnected to said shaft means.

8. A cultivator as claimed in claim 7, wherein each wheel is rotatably mounted on a corresponding shaft and arm, said arm being pivotable about an axis that extends substantially horizontally perpendicular to the direction of travel, said hydraulic assembly pivotably interconnecting said arm and the supporting structure via adjustable connection means, whereby a limited extent of free movement of said arm and wheels is possible in any position of extention of the piston rods of said assembly, said adjustable connection means including slideable pins in slots of said supporting structure.

9. A cultivator comprising a frame having a front coupling member for connection to a prime mover and soil working means rotatably supported on said frame, said soil working means being positioned transverse to the normal direction of travel, driving means connected to said soil working means to rotate same, a power driven roller being positioned a substantial distance to the rear of said soil working means, said driving means including a forward gear transmission in driving engagement with said soil working means and connectable to a power take-off at the rear of the prime mover, a second gear transmission in driving connection with said roller and a telescopic transmission shaft drivenly interconnecting the first and second transmissions, said roller being rotatably mounted on a supporting structure and said structure including beam means that extends above said transmission shaft to said coupling member, said supporting structure being pivotably connected to said frame means, a part of said supporting structure being connected to ground wheels and pivotable with respect to the remainder of said structure to match ground undulations during travel.

* * * * *